March 24, 1964  J. A. SAFFIR  3,126,429
METHOD OF CASTING TEETH HAVING DIFFERENTLY COLORED LAYERS
Original Filed Oct. 21, 1960

INVENTOR.
JACOB A. SAFFIR
BY
ATTORNEY

Patent Office 3,126,429
Patented Mar. 24, 1964

3,126,429
METHOD OF CASTING TEETH HAVING
DIFFERENTLY COLORED LAYERS
Jacob A. Saffir, Los Angeles, Calif., assignor to The Dentists' Supply Company of New York, York, Pa., a corporation of New York
Original application Oct. 21, 1960, Ser. No. 64,177. Divided and this application Apr. 5, 1962, Ser. No. 185,363
2 Claims. (Cl. 264—20)

This invention relates to plastic artificial teeth and more particularly to the manufacture of artificial teeth from the reaction product of epichlorohydrin with the diphenols, which product is commonly known as an epoxy resin and also as an epi-epoxide and ethoxyline resin, the present application being a divisional application of my copending application for Letters Patent, Serial Number 64,177, filed October 21, 1960, and now abandoned.

Plastic teeth are preferred to the stronger, longer lasting porcelain teeth for various reasons and for various uses but present day plastic artificial teeth have a number of shortcomings which limit their use to temporary dentures or to positions where they will not be subjected to must masticatory action.

It is an object of this invention to provide a plastic artificial tooth that offers the needed abrasion resistance to withstand rapid erosion of its anatomical structure.

It is an object, further, to maintain continued chewing efficiency of the teeth by maintaining the original ideal anatomy indefinitely. For example, most of the plastic artificial teeth on the market today are made from acrylic resins. These resins are so low in abrasion resistance that the American Dental Association carried an article in its journal by John R. Beall, research associate at the Bureau of Standards, under the heading of "Wear of Acrylic Resin Teeth," from which I quote the closing admonition, ". . . it is suggested that the practitioner continue to warn his patients that acrylic teeth are experimental rather than permanent."

But—so high is the abrasion resistance of the epoxy resins that in a standard test, a liter of sand had been dropped from the top of the dropping funnel 200 times without signs of wear.

In fact, to quote from Modern Plastics of July 1955, from When and How to Use Epoxies, " . . . The results of dropping ball impact tests show that new extremes of testing stress are necessary."

Another object of this invention is to create a plastic tooth of greater tensile strength than was heretofore possible. The tensile strength of unmodified epoxies is approximately 12,000 p.s.i. In acrylics, it is 8000 p.s.i.

A further object of the invention is the production of a plastic tooth with much greater compressive strength than is found in present plastic teeth. In epoxies it reaches 30,000 p.s.i. and in acrylic it is only 13,000 p.s.i.

Yet another object of this invention is the production of a plastic tooth with greater resistance to distortion by heat. In epoxies, the distortion can be avoided up until 334° F.; in acrylics it is only 180° F.

Other objects and advantages of the invention and a full understanding of the principles thereof will be apparent from the accompanying drawings and the following description of a presently preferred embodiment of the invention, in which.

There are a number of epoxy type resins that may be used in casting artificial teeth, such as Maraglass—a watery, white, transparent epoxy manufactured by the Marblette Corporation, Epon—manufactured by Shell Chemical Corporation, Polycast—manufactured by Poly Resins Company; Epiphen—manufactured by Borden Chemical Company, and many others.

However, a more detailed description will ge given of the use of Scotch Cast, Resin No. 2, a product of the Minnesota Mining and Manufacturing Co., which resin was found adaptable for application to my purpose with the addition of an accelerator to promote polymerization.

The chemistry and methods of manufacturing this type of epoxy resin are discussed in detail in Greenlee Patents No. 2,615,007 and No. 2,615,008.

Teeth of epoxy type resin, comprised as they are of 100% resin solids, shrink so little during curing that shrinkage control is not a factor in their manufacture.

For producing these teeth no pressure or increased heat is required during polymerization. The resin is pourable at room temperature. These advantages simplify the casting process for plastic teeth and insure more perfect results.

After curing, teeth from epoxy resin show almost no cold flow. Furthermore, the epoxy resins are quite stable, are insoluble in normal mouth fluids, even in the mouth fluids of diabetics where small amounts of acetone may be present, are insoluble in alcohol or in alkaline denture cleaning substances.

Scotch Cast Resin No. 2 whose use is here detailed is furnished in two parts, each of which is liquid. When ready to use, stir each part well, combine, and mix together thoroughly. This mixture will retain its liquid form for up to two hours but is generally promptly poured into the mold through the opening, here shown as 2 in both FIGURES 1 and 2.

Only a single opening or duct, 2, is here illustrated, but it is understood that where the mold is large—as it would be for several teeth—more than one duct would be desirable. Extra ducts could also serve as vents.

Figure 1:
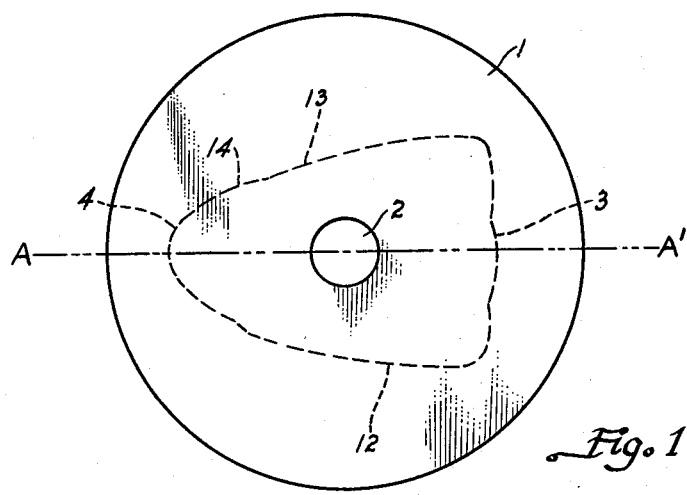
FIGURE 1 is a top view of a flask in which teeth are placed for curing.

In FIGURE 1, which is the top view of mold 1, the dotted line 4 outlines the tooth shaped cavity within the mold, 3 is the incisal area, 12 the mesial, 4 the gingival, and 13 the distal of this tooth shape.

Figure 2:
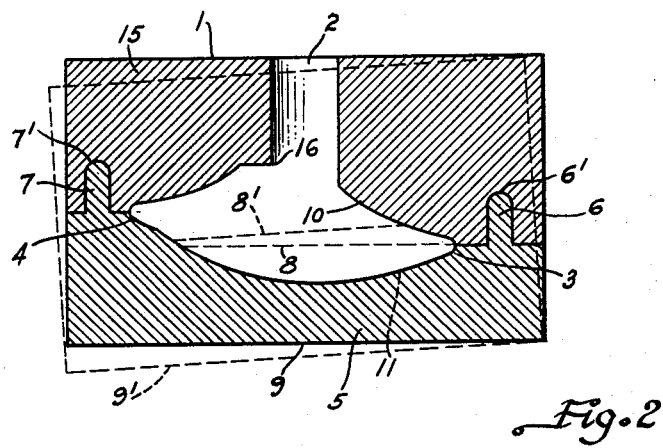
FIGURE 2 is a transverse sectional view along the lines A—A' in FIGURE 1.

In FIGURE 2, the mold illustrated is made of metal and is shown to comprise an upper section 15 and a lower section 5.

A one piece mold can be made from any material that permits the removal of the cast tooth without breakage. Many of the flexible, rubber-like plastic molding materials lead themselves to this.

On the other hand, the mold may be made of a number of parts to facilitate the removal of a complex structure.

Any material hard enough and chemically inert to the epoxies may be used to construct the mold. Metals like iron, copper, and the like, suitable plastics, even a hard stone or plaster may be used.

In FIGURE 2, accurate assembly of the upper section 15 and the lower section 5 of the mold 1 is achieved by guide pins 6 and 7 in the lower section 5 when they are fitted into the holes 6' and 7' in the upper half 15.

The parts of a mold or flask must be thoroughly cleaned before assembly and the surfaces of the mold bed prepared with a thin coat of any good mold release material—such as one of the silicone solutions.

Where a tooth of one color is desired, it can be prepared in one stage by merely pouring the prepared, pre-colored epoxy liquid mixture into the mold in a quantity to reach at least to point 16 in the mold 1. Vibrating the mold during the pouring or subjecting the mold to a vacuum after pouring is advisable to eliminate the possibility of bubbles. One or the other of these procedures should be followed with each pouring.

Shaded effects and colors may be produced by building up the tooth with layers of epoxy resin. In such cases, however, the first layer is permitted to gel before the second is added and the second layer must gel before the third layer is poured and so on.

Where a tooth is to be made with more than one layer, the enamel colored epoxy resin is first poured into the mold but in a quantity premeasured to fill it to the dotted line 8 in FIGURE 2, which dotted line 8 determines the junction of the enamel and body portions. Since the tooth form is so arranged in the mold 1 that this line 8 is parallel to the bottom 9 of the lower half 5 of the flask, simply positioning the flask 1 normally on its base 9 will cause the desired distribution of the enamel epoxy over the labial surface 11 and incisal area 3.

Should a further layer be desirable for better color or shading, and this first poured enamel colored epoxy resin has already gelled in the contained area bounded by dotted line 8, another pouring can be made through the same opening 2. This time it will be to achieve a second layer of epoxy resin, properly colored and premeasured in amount to occupy the area from dotted line 8 to dotted line 8'. Its positioning will be achieved by tilting the flask to the position 9', bringing 9' and 8' into parallel. This layer, of course, is vibrated or subjected to vaccum and, until it gels, the flask can be supported by any means to maintain the predetermined angle. The next layer can completely fill the mold.

By tilting the mold, pouring in measured quantities of epoxy resins, and maintaining the predetermined angle until gelling has taken place, a large variety of combinations is possible.

To fabricate from the epoxy resins, the mixed product of the two liquid parts is permitted to stand at room temperature whereupon a gel occurs in from three quarters of an hour to two hours. It is at this stage that a second layer can be poured into the mold. If time is a factor, the mold can be heated to 140° F. and a gel will be obtained in fifteen minutes. Each pouring must be permitted to gel before the next is added.

The vibrating or vacuuming process having been repeated for each layer and the mold being completely filled, it is now set aside at room temperature to cure. This will take from 24 to 36 hours but acceleration may be obtained by permitting the epoxy resin to set at room temperature for from two to four hours and then to finish its curing with heat of 140° F. for another two to four hours.

Where a relatively large bulk of resin is to be achieved as would be the case in large teeth, it is preferable to pour the resin in several layers, allowing each layer to gel before the next is added. This will minimize the temperature rise resulting from the heat generated during polymerization, which is exothermic. This method will also eliminate the possibility of volatilization and subsequent air bubbles in tooth casting.

Various coloring agents can be used with the epoxy resins. Degrees of orange and yellow can be obtained from cadmium sulfoselenide. For medium to very light yellow, chrome yellow will serve and for very light yellows that are sulfide stable, strontium yellow is suggested. For white, titanium dioxide and for browns, iron oxide is satisfactory; for greens and blues, chrome green, ultramarine, or cobalt blue. Maroons and reds can be obtained with quinacridone or any of the barium or calcium lithols or red lake C.

When the resin has completely hardened, the tooth is removed from the mold and the sprue detached.

It is understood that the invention is not limited to the specific embodiment or the preferred form specifically illustrated and described but may be used in other ways without departure from its spirit as defined by the following claims.

I claim:

1. A method of casting artificial teeth having differently colored layers from liquid epoxy resins suitably colored and comprising the steps of pouring into a mold a first measured amount of liquid epoxy resin of a predetermined color and less than the volumetric capacity of the mold cavity to form one layer of a tooth, permitting said first measured amount to partially polymerize to gel consistency, then pouring a second amount of a differently colored liquid epoxy resin into the mold cavity to fill the same and bond to the gel of said one layer of resin incident to complete curing of said second amount of plastic and the entire composite plastic tooth, and removing the completed cast epoxy resin tooth from the mold cavity.

2. A method of casting artificial teeth having a plurality of differently colored layers from liquid epoxy resins suitably colored and comprising the steps of pouring into a mold cavity complementary to the shape of a desired artificial tooth a first measured amount of liquid epoxy resin less than the volumetric capacity of the mold cavity and of a predetermined color to form one of the exterior layers of an artificial tooth, permitting said layer partially to polymerize to gel consistency, pouring a second measured amount insufficient to fill said mold cavity and of a differently colored liquid epoxy resin into the mold cavity and tilting said mold a desired amount for forming said second amount of resin into a layer of uneven thickness and permitting the same to polymerize partially to bond to said first amount of resin, and pouring a third amount of liquid epoxy resin of different color than that of said second amount into said mold cavity to fill the same, permitting said third amount to bond to said second amount and curing the entire composite tooth, and removing the completed cast epoxy resin tooth from the mold cavity.

References Cited in the file of this patent

Golding: Polymers and Resins, published in 1959 by D. Van Nostrand Co., pp. 650, 651.